June 13, 1961 R. A. GREA ET AL 2,988,276
TYPE COMPOSING APPARATUS
Filed Jan. 7, 1954 4 Sheets-Sheet 1
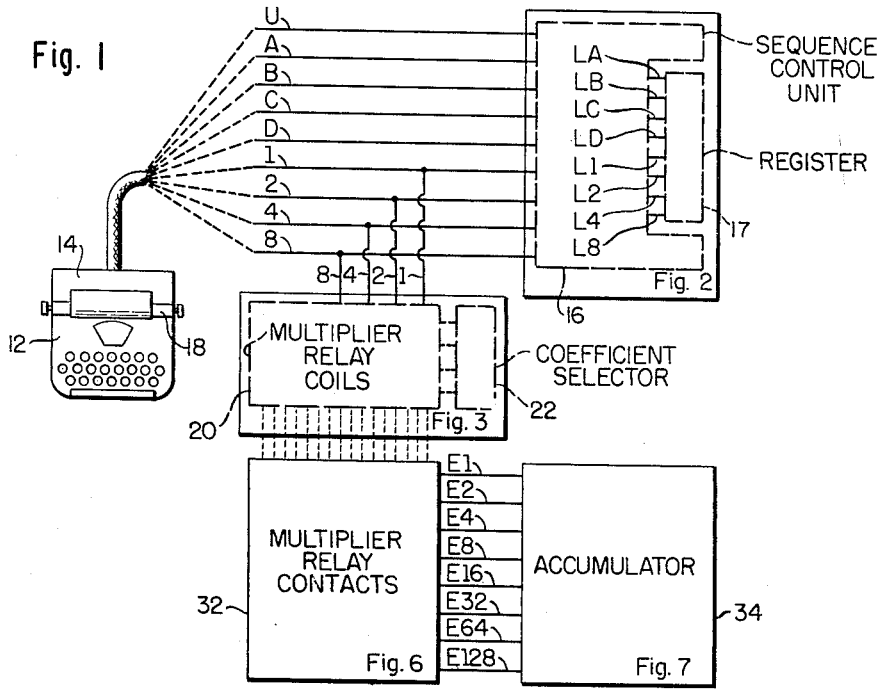
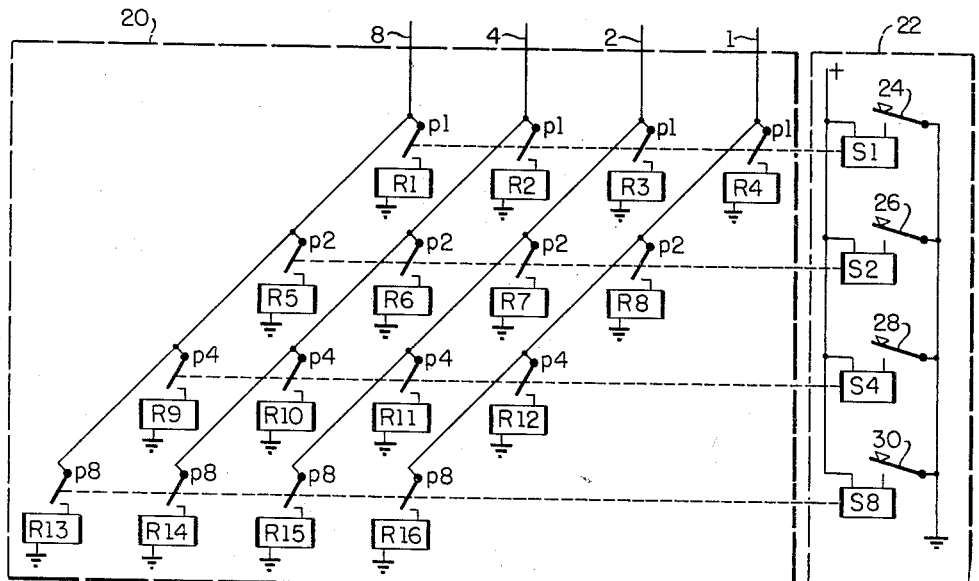
Fig. 3
INVENTORS
RENÉ A. HIGONNET
LOUIS M. MOYROUD
ELLIS P. HANSON
RENÉ A. GREA
BY
ATTORNEYS

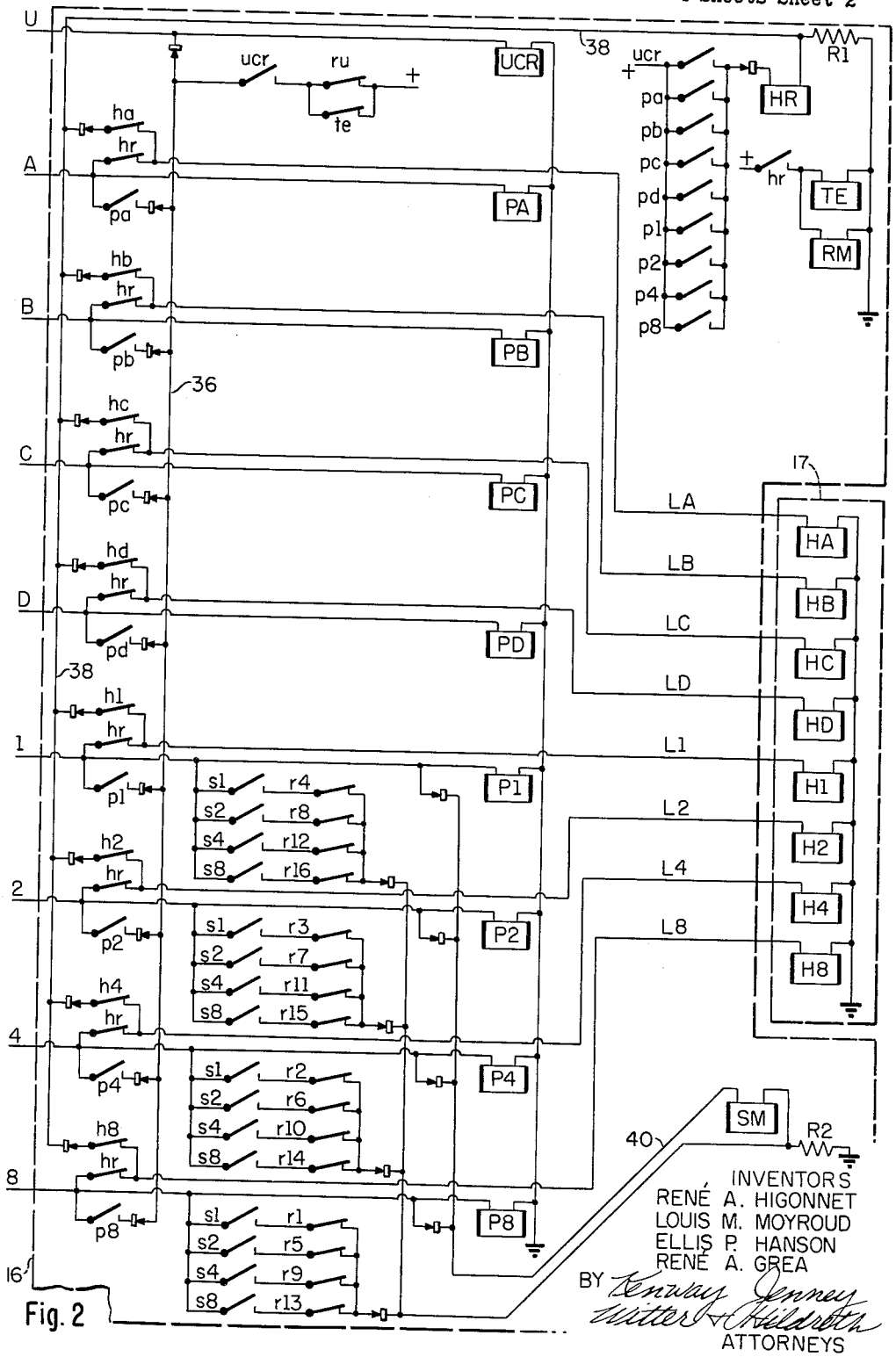

June 13, 1961  R. A. GREA ET AL  2,988,276
TYPE COMPOSING APPARATUS
Filed Jan. 7, 1954  4 Sheets-Sheet 3

INVENTORS
RENÉ A. HIGONNET
LOUIS M. MOYROUD
ELLIS P. HANSON
RENÉ A. GREA
BY
*Kenway Jenney*
*Witter & Hildreth*
ATTORNEYS

United States Patent Office 2,988,276
Patented June 13, 1961

2,988,276
TYPE COMPOSING APPARATUS
Rene A. Grea, Cambridge, Ellis P. Hanson, Rowley, Rene A. Higonnet, Cambridge, and Louis M. Moyroud, West Medford, Mass., assignors, by mesne assignments, to said Higonnet and said Moyroud
Filed Jan. 7, 1954, Ser. No. 402,785
12 Claims. (Cl. 235—151)

The present invention relates generally to type composing apparatus. More particularly, it relates to apparatus associated with a keyboard upon which the characters in a line of type are selected, the said apparatus being adapted both to control the coded recordation of selected information in a register, and to accumulate corresponding dimensional information for justification of the line.

With the advent of improved, versatile and rapid photographic type composing apparatus have come numerous problems arising from adaption of the new techniques to meet specialized problems heretofore solved either by the older methods of metal casting, or by tedious manual methods. Other problems have arisen from an effort to realize more fully the potentialities of the newer methods by providing functions not heretofore attempted in the older modes of type composition.

The present invention is concerned more particularly, although not exclusively, with those problems which arise from utilization of a keyboard input mechanism in type composing apparatus. One form of apparatus of the general class referred to is described in the copending application of Higonnet and Moyroud, Serial No. 70,472, filed January 12, 1949, now Patent No. 2,682,814. In general, it includes a nonjustifying, equal-spacing typewriter, a set of permutation bars through which the struck keys cause energization of representative combinations of code leads, and a register having an array of discrete code elements in the form of depressible pins. The code elements are adapted to be actuated by hammers on a "writing" or "hammer" carriage which moves along the register, the hammers being actuated by solenoids connected with the code leads. The code leads are also connected with a "line counter" or "accumulator" which adds the width values of the characters as they are selected. Thus, after an entire line of characters has been typed, the counter will have provided a measure of the "line deficit," or shortage of the accumulated width total below the desired length of the justified line. The said application also describes apparatus by means of which this deficit is divided into suitable increments for distribution between the characters or words as the line is "transcribed" character-by-character from the register, through suitable optical projection means, to a photographic film.

Preferably, the input mechanism also includes set selector means and a multiplying device for taking set width changes into account, as generally described in the copending application of Caldwell, Higonnet and Moyroud, Serial No. 295,284, filed June 24, 1952, now Patent No. 2,876,687.

It is an object of this invention to provide input means to be actuated by a keyboard operator to cause the appropriate actuation of the register, including suitable controls over the movement of the writing or hammer carriage relative to the register, and also to cause the accumulation in the line counter of width values corresponding to each selected character and according to the selected set width therefor.

It is a further object to provide input means having the characteristic of certainty in the performance of the foregoing functions, although the duration and frequency of key actuations are irregular, being controlled by a human operator. Preferably, such means should accommodate the composing machine to the skills of an ordinary typist who may depress certain keys with greater force or for a longer time than others, or cause some keys to be struck in rapid succession, while striking others in slower succession.

A still further and related object is to insure the proper actuation of the selected code elements in the register, and the timely movement of the writing or hammer carriage to the next register position without erroneous actuation of the code elements in the new position.

A further object is to provide a counting device suitable for use in conjunction with the input means, and especially one capable of accumulating width values to be entered in fast and irregular succession as the keys are struck by the operator.

With these and other objects in view, a feature of the invention comprises relay input means adapted to be connected with the code leads extending from the permutation bars, and to control both the register and line counter entries.

According to a further feature, the relay input means includes provision for sequence control over the various functions initiated by the striking of the keys, whereby the performance of each function is insured and input errors are obviated.

Another feature consists in the use of a binary line counter of a type which is actuated by binary input leads to be simultaneously energized a single time for entry of each successive character width value. These entries each cause the counter to advance from a condition representing the preceding accumulated total to the total including each newly added width value, without the need for transferring any numerical values to intermediate temporary storage facilities.

Other features include certain circuits, controls, structures, connections and arrangements of the elements which will be more clearly understood with reference to the illustrated embodiment as hereinafter described, and which are specifically defined in the claims.

In the drawings, FIG. 1 is a block diagram of the pertinent portion of a type composing apparatus incorporating the invention, serving also as a key to the interconnection of the circuits shown in the other figures;

FIG. 2 is a schematic circuit diagram of the main parts of the storage and sequence control apparatus;

FIG. 3 is a circuit diagram showing the circuits for actuating the multiplier relay coils;

Block diagram and register

Figure 5:
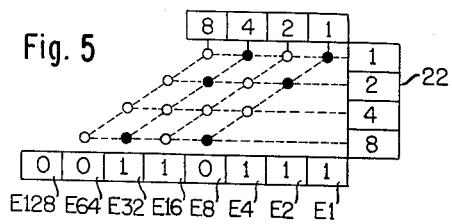
FIG. 5 is a diagram illustrating the operation of the multiplier.

Referring to FIG. 1, we provide a non-justifying typewriter 12 having a keyboard and the usual escapement-actuated platen carriage, whereby the operator is able to see the line as it is composed. In association with the keys of the keyboard, we provide a set of coded permutation bars 14 of the type used in telegraphic circuits, by means of which a set of nine leads U, A, B, C, D, 1, 2, 4 and 8 are connected with a source of voltage in combinations corresponding to the selected characters. Suitable permutation mechanism for this purpose is disclosed in the copending application of Higonnet and Moyroud, Serial No. 770,320, filed August 23, 1947, now Patent No. 2,790,362 except that in the present instance more code leads are utilized and the number of possible combinations thereof is correspondingly increased. We preferably divide the code leads into a width-selector group, comprising the leads U, 1, 2, 4 and 8, and a character selector group comprising the leads A, B, C and D, in accordance with the principles of the said application Serial No. 70,472, now Patent No. 2,682,814.

The code combinations for each character are determined in the following manner. To each character there is assigned an arbitrary numerical value called the "relative width value," which may be defined as the width in suitable units taken up by the character, including a pro rata share of the intercharacter space, in an arbitrarily selected size and set width. The various characters in the alphabet have different relative width values, ranging in this case from the possible values of zero to $2^4=16$. These values are translated into binary notation, so as to permit them to be represented by the width selector leads 1, 2, 4 and 8. The reference numbers of the leads respectively represent the order of the binary number represented. An energized lead represents the digit "one" and an unenergized lead the digit "zero," there being only two possible digits in any order of a binary number, as is well known. The lead "U" is energized by the permutation bars whenever a key is depressed which involves a spacing movement, such as a character or word space. On the other hand, this latter lead is not energized when no width entry is involved, as when the case shift key is depressed.

The leads A, B, C and D are used for several purposes. In the case of different characters having the same relative width values, these leads are energized in different combinations for each such character so that they will be unambiguously distinguished. Also, certain combinations of these leads are used to represent various operations other than the storage of characters, such as case and font shifts, changes in size and set, tabulation, etc.

The leads from the permutation bars are connected with a sequence control unit 16, which in turn controls the energization of combinations of eight leads LA, LB, LC, LD, L1, L2, L4 and L8, each corresponding to a lead from the permutation bars. The leads LA, . . ., L8 enter a register 17 where they are connected respectively with hammer solenoids HA, . . ., H8 (see FIG. 2). The solenoids are engageable with a hammer carriage which is in turn mechanically coupled with the platen 18 of the non-justifying typewriter. Each solenoid has a movable core which engages a hammer, the hammer being presented to consecutive pins in the register "memory field" as the typewriter carriage moves along. If a lead to a particular solenoid is energized, the corresponding hammer is actuated to depress a pin from its "normal" or unactuated stable position to a second, alternative stable position. Details of the register structure are fully given in the copending application of Higonnet and Moyroud, Serial No. 187,476, filed September 29, 1950, now Patent No. 2,690,249. It will be noted that the connections in the illustrated embodiment are assumed to be made directly to the hammer solenoids. Alternatively, they could be made through double-throw switching relays, whereby one of two alternative sets of hammer solenoids, each in a separate register, may be energized as described in said application, Serial No. 70,472, now Patent No. 2,682,814.

As explained in the last-mentioned application, the hammer carriage is also preferably provided with correction means to permit a character erroneously entered into the pins to be "erased" and a correct character substituted. This correction procedure also involves the line counter, from which the width of the erroneous character must be subtracted. However, since the correction means and apparatus are pertinent to this invention only in the sense that it may be added without impairing the function thereof, it is not herein described in further detail.

*Multiplier*

Figure 4:
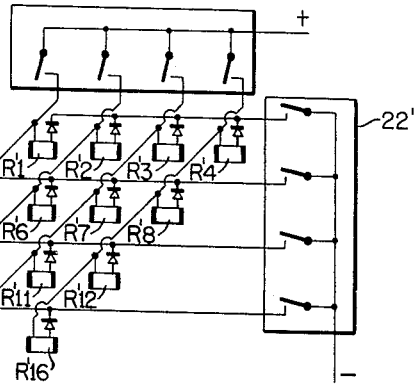
FIG. 4 is a circuit diagram of an alternative circuit for energizing the multiplier relay coils.

The leads 1, 2, 4 and 8 also enter a multiplier relay coil unit 20 (FIGS. 1 and 3), where a combination of sixteen relays R1, . . ., R16 is energized according to the combination of the leads 1, 2, 4 and 8 that is energized, as well as the combination of four relays S1, S2, S4 and S8 is energized. The latter relays comprise a coefficient selector 22 similar to the unit described in the said copending application Serial No. 295,284. The set width for each character to be typed, which takes the point size as well as the set into account, is manually entered as a binary number by closure of keys 24, 26, 28 and 30, representing respectively the binary orders "1," "2," "4" and "8." The relays S1, . . ., S8 have contacts in the circuit 20 indicated by the dashed lines which permit the energization of relays R1, . . ., R16 which lie in the circuits of leads 1, 2, 4 and 8. Thus, in all essential respects, the circuit 20 is like the circuit shown in FIG. 4, which is fully described in said last-mentioned application, wherein the four upper enclosed contacts correspond to the leads 1, 2, 4 and 8 of the present embodiment, and the contacts 22' correspond to the unit 22 of the present embodiment.

Figure 6:
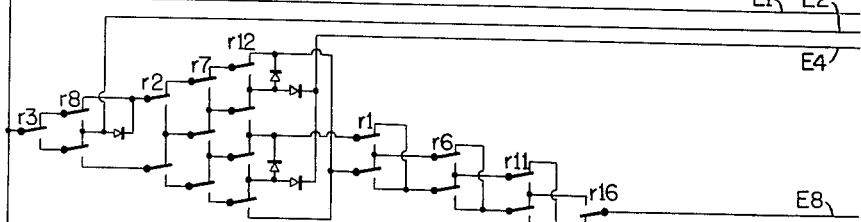
FIG. 6 is a diagram of the circuit connecting the contacts of the multiplier relay coils.

The relays R1, . . ., R16 each have contacts in a circuit 32 shown in FIG. 6, which is identical with a circuit shown and described in said last-mentioned application. The operation of the circuit is described with reference to FIG. 5. The leads representing the relative width value and the coefficient or set are respectively represented by blocks showing the binary orders of the respective leads. The horizontal dotted lines correspond to the mechanical linkages between the relays S1, . . ., S8 and their contacts in the circuit 20, while the diagonal lines communicate with the leads 1, 2, 4 and 8. Assuming that a given character has a relative width value of "5" and a point set, or coefficient, of "11," the circles appearing where the energized leads intersect the horizontal dotted lines of energized set width relays are indicated in black. The values to be represented on the leads E1, . . . E128 are found by binary addition of the vertical columns of black circles. Thus, starting at the right, a voltage appears on each of the leads E1, E2 and E4. The lead E8 remains unenergized, while sending a carryover to the lead E16. The lead E32 also receives a voltage. It may be readily vertified that the number indicated by the energized leads E1, . . ., E128 is "55," that is, $32+16+4+2+1$.

Referring to FIG. 3, the particular "partial product" relays R1, . . ., R16 to be energized by actuation of the permutation bars and coefficient selector 22 are determined in the same manner as the black circles of FIG. 5. Thus, in the indicated example, by closure of the appropriate contacts the relays R2, R4, R6, R8, R14 and R16 are energized.

It may be readily verified from FIG. 6 that voltages will then be applied to the same leads El, . . ., E128, as are indicated diagrammatically in FIG. 5. In FIG. 6, each column of transfer relay contacts bears, at the head of the column a numerical designation showing that the contacts belong to the relay bearing the same arabic numeral. Thus, the two columns of contacts headed $r12$ belong to the relay R12. All relay contacts are shown in FIG. 6 in the positions reached when the corresponding relays are unenergized.

In FIG. 6 it may be seen that the circuit to the lead E2 comprises two paths, one which connects a battery to lead E2 when either the relay R3 and R8 is energized alone while the other remains unenergized, and a second which sends a carry-over voltage to the following stage (E4) when both relays R3 and R8 are operated simultaneously.

Instead of having a single input lead, the circuit of the E4 stage (involving contacts of the relays R2, R7 and R12) has two inputs. The upper input lead receives the battery voltage when there is no carry from stage E2, that is, when the relays R3 and R8 are both at rest or when only one of them is energized. The lower input lead is connected to the battery when both relays R3 and R8 are operated simultaneously. It may be verified that the battery cannot be connected simultaneously to both inputs; in other words, the two carry-over circuits are disjunctive.

The circuits connected to the lead E4 are also of the type responsive only to the number of relays energized, as contrasted with their rank. If the battery is connected to the upper or "no carry" lead it is connected to the lead E4 either when only one or all three of the relays R2, R7 and R8 are energized; also, a potential is transferred to the "zero" or lower of the two leads connected to the following stage E8 when either none or only one of these three relays is energized. If the battery is connected to the lower input lead, with the "carry" value of "4," it may be seen that a potential is connected to the lead E4 when either all three relays are at rest, or any two are energized; also, a potential is connected to the following stage on the "zero" or lower level when none of the three relays is energized, and to the upper level when one or two of the three relays are energized, and so on.

The circuit has been divided into two groups of relay contacts with a view to reducing the number of rectifiers operating in series. It may be seen that the second or lower group of contacts operates on the same principles as those heretofore described for the stages E1, . . ., E8.

It is obvious from the above that the multiplier of FIGS. 3 and 6 is of the type which produces voltages simultaneously on the respective leads E1, . . ., E128 representing in binary form the desired product. This product represents the actual width value of the character which is entered into the line counter.

Line Counter

Figure 7:
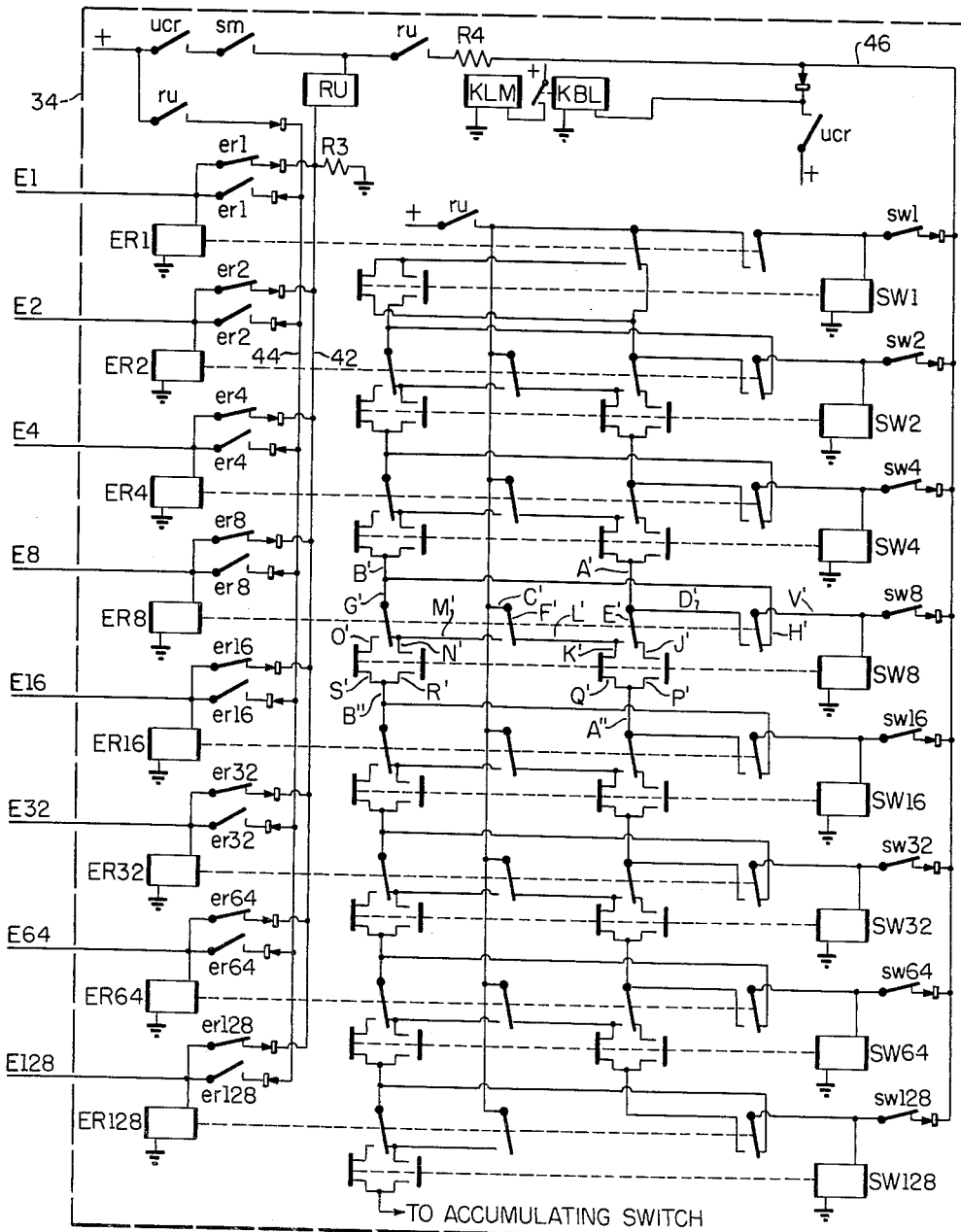
FIG. 7 is a schematic circuit diagram of the "adder," which is also termed an "accumulator" or "line length counter"

FIG. 7 is a diagram of the line counter or accumulator 34 which receives the impulses from the multiplier of FIGS. 3 and 6. Each of the output leads from the multiplier E1, E2, . . ., E128 operates a relay which we shall designate by a corresponding reference number ER1, ER2, . . ., ER128. The transfer contacts in horizontal alignment with each of these relays are actuated by its armature in each instance, as indicated by broken lines. The counter has a carry-over lead from its highest order digit to an accumulating switch, not shown. The latter switch counts the number of times the counter reaches its capacity, and is fully described in said application Serial No. 70,472, now Patent No. 2,682,814.

Let us first consider the operation of the first stage, which comprises an input relay ER1 by which the input signals at the "unit" level are received and a binary switch SW1 having two stable positions which indicates and maintains the numbers stored in the stage from one operation to the next. Upon the termination of each input signal on the lead E1 the binary switch SW1 is advanced from its "0" to its "1" position, or vice versa.

Figure 8:
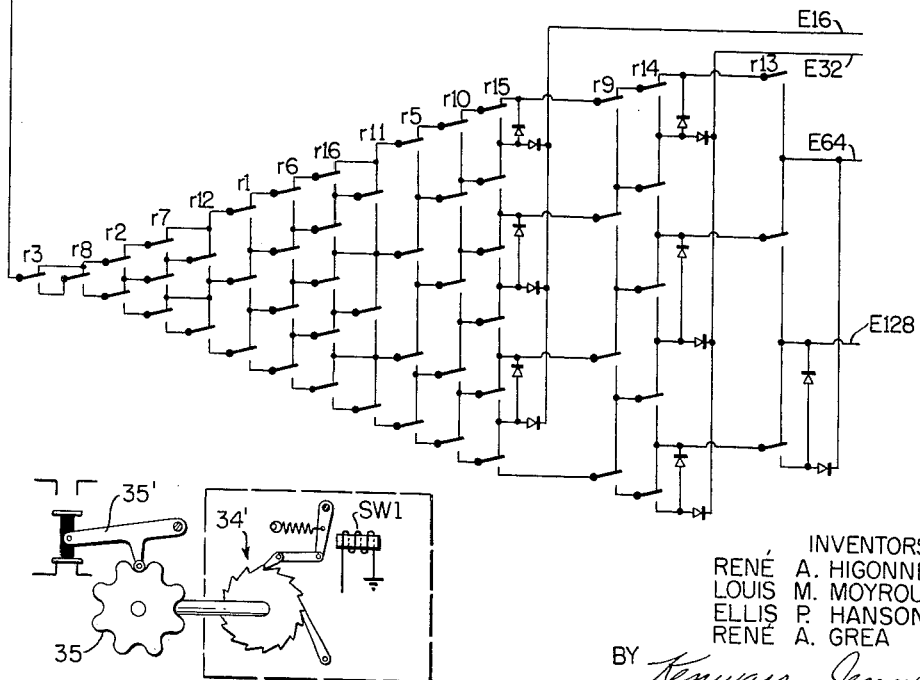
FIG. 8 is a diagram of an illustrative form of counter stepping switch.

The structure of the switch SW1 is of the type commonly used in telephone stepping switches of the spring-acting type, and is such that its position changes, not when the voltage is applied to the coil, but when it is removed. One form is illustrated in FIG. 8, but it will be apparent that other equivalent forms may also be employed. Referring to FIG. 8, there is provided a ratchet wheel and pawl mechanism 34' so arranged that when current is applied to the magnet SW1 the armature pulls the pawl backwards against the force of a tension spring, and when the current is cut off the pawl advances a cam 35 one step. The cam is mechanically coupled with the ratchet wheel by a shaft. In contact with the cam is a follower and lever linkage 35' coupled with the "pi" contacts associated with the switch SW1. Thus, each pair of "pi" contacts is closed following every second energization of the magnet SW1. The two positions are designated, respectively, the "0" and "1" positions. Thus, if the switch was in the "0" position when the voltage was applied, it remains in this position until the input voltage to the relay ER1 is removed, and then drops into the "1" position, indicating that a unit is stored in the counter. At the succeeding input signal to the relay ER1 the capacity of the first stage is exceeded and the switch SW1 returns to its "0" position sending a "carry" signal having a value of two units to the succeeding stage E2.

It is assumed above that contacts *ru* forming a part of the sequence control unit are closed. The method by which these contacts are closed is hereinafter more fully described under the heading "Sequence Control."

Succeeding stages operate similarly, but each must also be provided with means to detect the presence of a "carry" signal from the preceding stage. A description of the basic counting circuit will be given with reference to the stage E8.

Each position of the stage E8 is governed by three factors:

(*a*) whether or not an input has occurred by energization of the input relay ER8, indicated by the position of its contacts;

(*b*) whether or not there is a carry from the preceding stage E4, as indicated by the presence of battery voltage on the lead B' (indicating carry) or lead A' (indicating no carry); and (*c*) whether the stage is initially in its "0" or "1" position, as indicated by the position of the binary switch contacts. These contacts have been shown in the form of a "pi," as is customary in switching circuits. The contacts in horizontal alignment with each stepping switch in the figure correspond to it. Each switch is shown in its "0" position, that is, with the left-hand contacts in each pair closed. When it is in its "1" position the right-hand contacts are closed.

On the basis of these three conditions the operation of the E8 stage is as follows:

*First case.*—The binary switch SW8 is initially in its "0" position.

(1) If no carry is received from the preceding stage, that is, if the battery is connected to the lead A', there are two cases to consider:

First, if there is no input signal, the binary switch SW8 is not actuated and the battery is connected to A" (no carry) via leads C', F', L', K', Q' and A"; and Second, if there is an input signal, the binary switch is actuated via leads A', D' and V', and the battery is connected to A" (no carry) via leads A', E', K', Q' and A".

(2) If a carry is received from the preceding stage, that is, if the battery is connected to the lead B', there are two cases to consider:

First, if there is no input signal, the binary switch SW8 is actuated (to "1") via leads B', H', and V', and the battery is connected to A" (no carry) via leads C', F', L', K', Q' and A"; and Second, if there is an input signal, the binary switch SW8 is not actuated and the battery is connected to B" (carry) via leads B', G', O', S' and B".

*Second case.*—The binary switch is initially in its "1" position.

(1) If no carry is received from the preceding stage, that is, if the battery is connected to A', there are two cases to consider:

First, if there is no input signal, the binary switch is not actuated and the battery is connected to A" (no carry) via leads A', E', J', P' and A"; and Second, if there is an input signal, the binary switch SW8 is actuated (to its "0" position) via leads A', D' and V', and the battery is connected to B" (carry) via leads C', F', M', N', R' and B".

(2) If a carry is received from the preceding stage, that is, if the battery is connected to B', there are two cases to consider:

First, if there is no input signal, the binary switch SW8 is actuated (to its "0" position) via leads B', H' and V', and the battery is connected to B" (carry) via leads B', G', N', R' and B"; and Second, if there is an input signal, the binary switch is not actuated and the battery is connected to B" via leads C', F', M', N', R' and B".

It may be seen that there is no accumulation of operating times in the accumulator whatever the number of entries or the position of the counter at the moment when a new number is received.

*Sequence control*

All of the operations previously described, which are carried out following actuation of the typewriter keys, are controlled in timed relation by a sequence control unit 16, most of which is shown in FIG. 2. In order to describe the operation of this unit, it is convenient to start with the actuation of a typical character key, resulting in energization of a corresponding combination of the leads U, A, B, C, D, 1, 2, 4 and 8.

All of the input leads except U are connected directly through break contacts *hr* on a hammer relay HR with the hammer solenoids HA, . . ., H8 which depress the register pins as previously described. (The notation for these contacts is typical of that used throughout this description: they bear the same letter designation as the relay to which they belong, but in the lower case.)

At the same time, repeating relays UCR, and PA, . . ., P8 are energized, since each is connected directly with one of the input leads U, . . ., 8. Since the character used in this example will have width value, the relay UCR will be among the relays energized. Holding circuits for each repeating relay that is energized are provided. These include a make contact *pa*, . . ., *p8*, a common connection 36, make contacts *ucr*, and parallel-connected break contacts *ru* and *te*. This holding or locking circuit permits the repeating relays to become deenergized only after the inputs are no longer needed, and the repeating relays thus maintain the input code in the event that the voltages on the leads U, A, . . . , 8 are too brief to allow complete operation of the pinsetting and counting circuits.

In addition to the foregoing, if any of the repeating relays is energized, its make contacts *ucr, pa,* . . ., *p8* cause energization of the hammer relay HR, which will disconnect the hammer solenoids from the code busses, and also energize parallel-connected magnets TE and RM. (See upper right in FIG. 2.) The magnet TE is the usual typewriter escapement magnet, which produces a spacing movement of the platen carriage immediately upon being energized. The magnet RM is mechanically engageable with each of the hammers and withdraws them when energized. This increases the safety of the mechanical carriage advance sequence and insures freedom from jamming by causing the hammers to return before the typewriter platen is advanced to the next position.

Although as previously shown the relay HR may be energized upon the energization of any repeating relay, it may be prevented from being energized in this manner by a safety circuit, which connects the battery to the terminal of the relay HR connected with a resistor R1 until every energized hammer solenoid has been allowed to operate fully. This safety circuit is connected from the coil of each energized solenoid HA, . . ., H8 through its own break contact to a common lead 38.

Thus, the pin-setting sequence occurs in the following order: first, the energization of the permutation bar repeating relays UCR, PA, . . ., P8 and the hammer solenoids HA, . . ., H8; then the energization of the hammer relay HR, which in turn operates the escapement and hammer return magnets TE and RM, respectively. The relay HR remains energized until the repeating relays PA, . . ., P8 are released after the disappearance of the input voltages on the leads U, A, . . ., 8 and disconnection of their holding circuits. As to the holding circuits, which in each case includes the parallel-connected contacts *ru* and *te*, these will be disconnected only when both contacts *ru* and *te* are open simultaneously. The contacts *te* will open when the escapement magnet TE is energized; the contacts *ru* will open when a relay RU (FIG. 7) is energized as hereinafter described.

The counting operation proceeds concurrently with the pin-setting operation. First, note that the "relative width value" input leads 1, 2, 4 and 8 are connected (FIG. 2) through rectifiers and a common lead 40 with a multiplier safety relay SM. Contacts *sm* of this relay (FIG. 6) connect the battery to the various multiplier relay contacts leading to the binary product output leads E1, . . ., E128.

As in the hammer relay circuit described above, the battery may be connected to a resistor R2 on the ground side of the relay SM to prevent its energization by any one of sixteen circuits, four for each of the leads 1, 2, 4 and 8. Each of these circuits includes a make contact of one of the set width relays S1, . . ., S8 and a break contact of one of the multiplier relays R1, . . . R16, the coils of which are shown in FIG. 3. Thus, the relay SM cannot be energized, nor can the product be transmitted to the counter until every multiplier relay R1, . . ., R16 which receives an energizing voltage has operated its contacts. For example, referring to FIG. 3, if the relay R1 is to be energized through energization of the lead 8 and the relay S1, then a circuit is completed, as shown in FIG. 2, from the lead 8, through the series-connected make contacts *s1* and break contact *r1* of the lead 40 to prevent energization of the relay SM until the relay R1 has operated and opened its contacts *r1*.

When the relay SM is permited to operate it connects the battery through the multiplier relay contacts (FIG. 6) to the relays ER1, . . ., ER128 (FIG. 7). Also, as shown in the upper part of FIG. 7, it connects the battery through a make contact of the relay UCR to the relay RU, which may become energized by current passing to ground through a resistor R3.

The relay RU has a safety circuit similar to those of the relays HR and SM. This circuit includes break contacts *er1*, . . ., *er128* of each of the line counter input relays and a common lead 42 connected with the resistor R3. This prevents energization of the relay RU until each of the relays ER1, . . ., ER128 which receives a voltage from the multiplier has operated its contacts.

When the relay RU is energized it closes make contacts *ru* (FIG. 7) connecting the battery to a lead 44, thus completing a holding circuit for each of the relays ER1, . . ., ER128 through its own make contacts. Also, it opens break contacts *ru* (see upper part of FIG. 2). Since at this moment the parallel-connected break contacts *te* will have been opened through energization of the escapement magnet TE as previously explained, the holding circuits of the relays PA, . . ., P8 will be broken, as the input signals are not needed once the ER relays of the counter have been energized and their holding circuits closed. Finally, make contacts *ru* (see upper part of FIG. 7), which were assumed closed in the preceding discussion of the line counter, connect the battery through the contacts of the relays ER1, . . ., ER128 in the counter chain to the binary switches SW1, . . ., SW128. Thus, until operation of the relay RU, the product transferred to the counter from the multiplier is not accumulated in the total as represented in the switches SW1, . . ., SW128.

The relay RU locks itself through a holding circuit (FIG. 7) including make contacts *ru*, a resistor R4, a lead 46, and circuits connected to the lead 46 through break contacts *sw1*, . . ., *sw128* in the counter circuit. The latter contacts belong to the switches SW1, . . ., SW128, but differ from the "pi" contacts previously discussed under "Line counter," in that they open whenever the coils of their respective switches are energized. Thus, the relay RU is held in the energized condition and the battery is connected to the counter chain and the E relays until all of the switches SW1, . . ., SW128 that receive voltages indicating a change of condition have operated their contacts.

When all energized binary switches SW1, . . ., SW128 have operated their contacts, the relay RU is deenergized. This marks the termination of the counting operation.

To summarize, the counting operation starts with the energization of the multiplier relays R1, . . ., R16; then follows the energization of the multiplier safety relay SM, then the counter input relays ER1, . . ., ER128, then the relay RU, then the binary switches SW1, . . ., SW128, and finally the release or deenergization of the relay RU.

Before the completion of the pin-setting and counting operations previously described, the entry of a second code signal from the permutation bars is prevented by the energization of a keyboard locking magnet KLM which is arranged to prevent operation of the keyboard. This magnet is connected to its energizing source through contacts of a relay KBL (FIG. 7). The relay KBL is first energized through make contacts of the relay UCR, and then, after the relay UCR has been deenergized through operation of the relay RU, through the parallel break contacts of the switches SW1, . . ., SW128 which also form the holding circuit for the relay RU.

It will be understood that the foregoing description of the invention has been given with reference to a preferred embodiment thereof, but that this has been done merely to furnish a concrete example and to facilitate an understanding thereof, and without any attempt to show the numerous variations of circuitry, controls, structures, arrangement, and modes of operation which would occur to one skilled in this art after a study hereof, and which can be carried out without departing from the spirit or scope of the invention.

Having thus described the invention, we claim:

1. In a binary accumulating device, the combination of a switch having two stable positions to represent each digit of a total, an input relay for each addend digit, a circuit to energize simultaneously the input relays of like digits of an addend to be accumulated, a circuit including contacts of said switches and relays to energize the switches, whereby after energization of the input relays the switches advance from positions representing a previous total to positions representing the previous total plus said addend, a control relay having make contacts connecting said last-mentioned circuit with a source of voltage, and a circuit to prevent energization of said control relay including break contacts of each input relay connecting its energizing circuit with said control relay.

2. In a binary accumulating device, the combination of a switch having two stable positions to represent each digit of a total, an input relay for each addend digit, connections to energize the input relays, a circuit including contacts of the input relays to change the positions of the switches, a control relay having contacts operative to energize said circuit, and a circuit to prevent energization of said control relay including break contacts of each input relay connecting its energizing circuit with said control relay.

3. In a binary accumulation device, the combination of a switch having two stable positions to represent each digit of a total, an input relay for each addend digit, connections to energize the input relays, a circuit including contacts of the input relays to change the positions of the switches, a control relay having contacts operative to energize said circuit, and a holding circuit for said control relay including break contacts of each switch connecting its energizing circuit with said control relay.

4. In type composing apparatus, the combination of code means operable to select the characters in a line of type, said means including binary code leads and provision to energize the leads representing like digits of a width value assigned to each character, binary set width relays, means to energize the set width relays representing like digits of a set width value selected for said character, partial product relays having energizing circuits under the control of said code leads and set width relays, a binary accumulator having an input relay for each addend digit, a circuit connecting contacts of the partial product relays with the input relays, a control relay having contacts to complete the connection of said last-mentioned circuit to an energizing source, and a number of parallel circuits to prevent energization of said control relay each including break contacts of a partial product relay and make contacts of a corresponding set width relay.

5. In type composing apparatus, the combination of code leads energizable to represent the selected characters in a line of type, a register including a number of code magnets operable by said leads, an escapement magnet, a control relay having contacts for connecting said escapement magnet with an energizing source, and a circuit to prevent energization of said control relay including break contacts of each code magnet connecting its corresponding code lead with said control relay.

6. In type composing apparatus, the combination of a key-operated code circuit energizable to represent successively the selected characters in a line of type, means operated by the code circuit and including a number of leads to represent numerically a width value corresponding to each character, a number of addend entry relays to be energized by voltages on said leads according to said width, a sequence relay having an energizing circuit operable on the condition that all addend entry relays receiving an energizing voltage are operated, a repeating relay energized by said code circuit and having a holding circuit including break contacts of said sequence relay, a coil energizable to cause locking of the keys and having an energizing circuit including make contacts of said repeating relay, switches operated by the addend entry relays to accumulate the widths of the characters, and a holding circuit for said coil and sequence relay adapted to open on the condition that all switches receiving an energizing voltage from the addend entry relays are operated.

7. In type composing apparatus the combination of a number of code leads, key-operated means to energize the leads to represent successively the widths of the selected characters in a line of type, switches connected with said leads and operable by voltages thereon to accumulate the widths of the characters, a coil energizable to cause locking of the keys and having an energizing circuit closed by said energizing means and a holding circuit adapted to open on the condition that all switches receiving an energizing voltage from said code leads are operated.

8. In type composing apparatus, the combination of a number of code leads, key-operated means to energize the leads to represent successively the selected characters in a line of type, a register having an entry circuit including a solenoid for each of said leads, a repeating relay having its coil directly connected to each of said leads, each repeating relay having a holding circuit connected from the corresponding code lead through its own make contacts, and a safety relay having a pair of break contacts connecting each of said solenoids to the corresponding code lead.

9. In type composing apparatus, the combination of a number of code leads, key operated means to energize the leads to represent successively the selected characters in a line of type, a register, code magnets connected with said leads and operable by voltages thereon to enter information corresponding to said characters in the register, and a coil to cause locking of the keys, said coil having an energizing circuit closed by said eenrgizing means and adapted to open on the condition that all magnets receiving an energizing voltage from said code leads are operated.

10. In type composing apparatus, the combination of a number of code leads, key operated means to energize the leads to represent successively the selected characters in a line of type, a register, code magnets connected with said leads and operable by voltages thereon to enter information corresponding to said characters in the register, a relay having a circuit connected with each of said code leads through contacts of the corresponding code magnet and operable when every magnet receiving an energizing voltage has operated, and a coil to cause locking of the keys, said coil having an energizing circuit closed by said energizing means and adapted to open only on the condition that said relay has operated.

11. In type composing apparatus, the combination of a number of code leads, key operated means to energize the leads to represent successively the selected characters in a line of type, a register, code magnets connected with said leads and operable by voltages thereon to enter information corresponding to said characters in the register, a first relay having a circuit connected with each of said code leads through contacts of the corresponding code magnet and operable when every magnet receiving an energizing voltage has operated, a second relay operated by said first relay, and a coil to cause locking of the keys, said coil having an energizing circuit closed by said energizing means and adapted to open only on the condition that said second relay has operated.

12. In type composing apparatus, the combination of a number of code leads, key-operated means to energize the leads to represent successively the selected characters in a line of type, a register having an entry circuit including a solenoid for each of said leads, a repeating relay having its coil directly connected to each of said leads, each repeating relay having a holding circuit connected from the corresponding code lead through its own make contacts, a safety relay having a pair of break contacts connecting each of said solenoids to the corresponding code lead, a circuit including parallel make contacts of the repeating relays to energize the safety relay, and a circuit connected from each solenoid through its own break contacts to remove the energizing potential from the safety relay.

References Cited in the file of this patent

UNITED STATES PATENTS

| | | |
|---|---|---|
| 2,364,540 | Luhn | Dec. 5, 1944 |
| 2,394,925 | Luhn | Feb. 12, 1946 |
| 2,601,281 | Hartley | June 24, 1952 |
| 2,638,267 | Hartley | May 12, 1953 |
| 2,679,975 | Grosvalet | June 1, 1954 |
| 2,719,670 | Jacobs et al. | Oct. 4, 1955 |
| 2,787,415 | Cartwright | Apr. 2, 1957 |